A. C. ANDERSON.
AGRICULTURAL IMPLEMENT.
APPLICATION FILED JUNE 18, 1908.

908,721.

Patented Jan. 5, 1909.

4 SHEETS—SHEET 1.

Witnesses:

Inventor:-
Archibald Clark Anderson
by
his Attorney

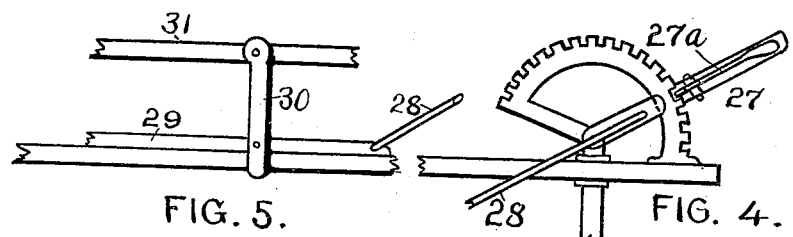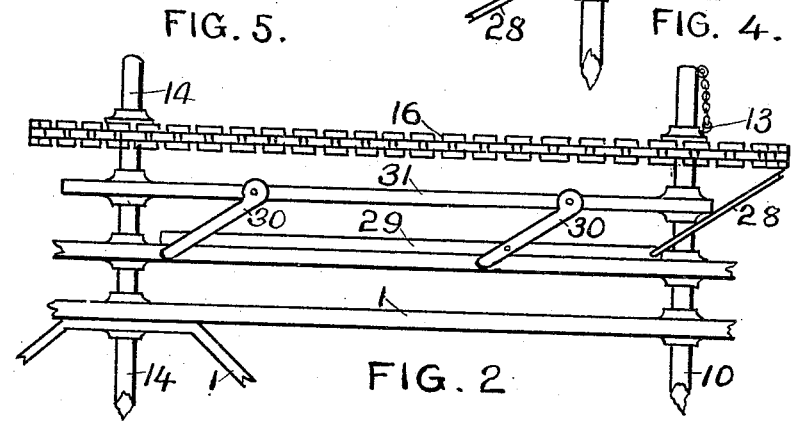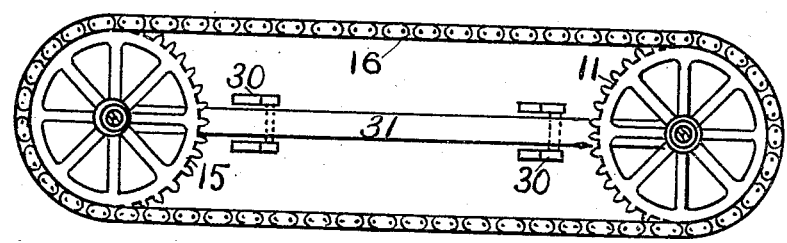

A. C. ANDERSON.
AGRICULTURAL IMPLEMENT.
APPLICATION FILED JUNE 18, 1908.

908,721.

Patented Jan. 5, 1909.

4 SHEETS—SHEET 3.

Witnesses:
Carissa Franck.
Julia E. Crane.

Inventor:-
Archibald Clark Anderson
by
his Attorney

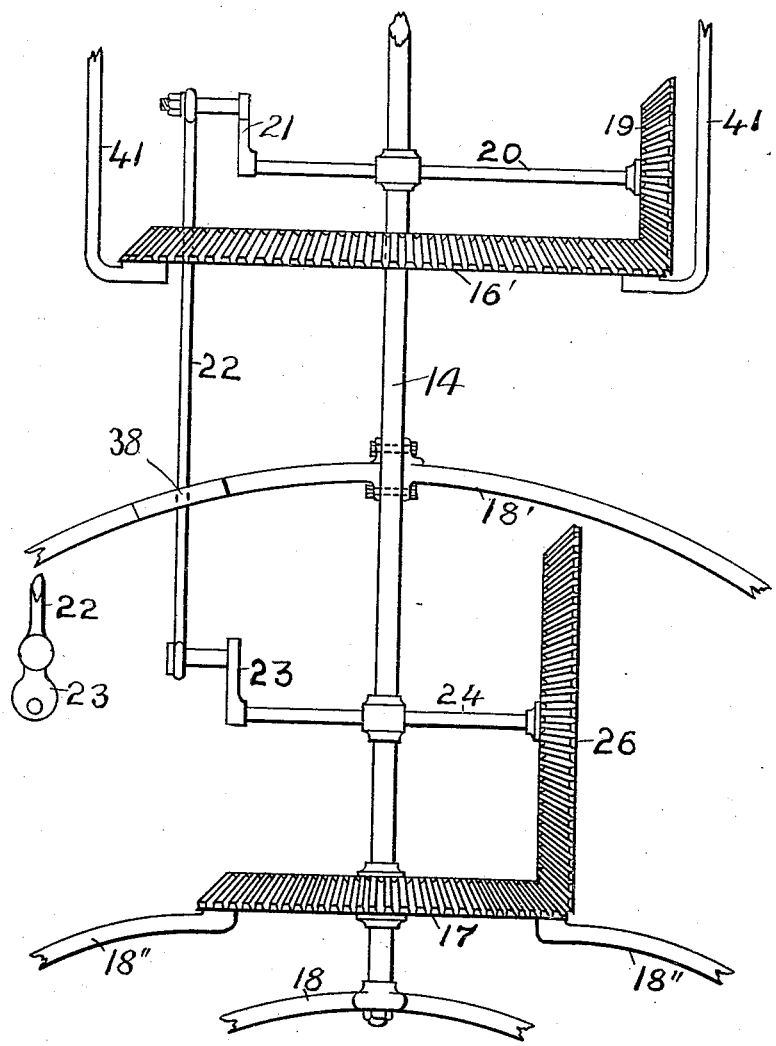

UNITED STATES PATENT OFFICE.

ARCHIBALD CLARK ANDERSON, OF STIRLING POINT, BLUFF, NEW ZEALAND.

AGRICULTURAL IMPLEMENT.

No. 908,721.      Specification of Letters Patent.      Patented Jan. 5, 1909.

Application filed June 18, 1908. Serial No. 439,173.

*To all whom it may concern:*

Be it known that I, ARCHIBALD CLARK ANDERSON, of Stirling Point, Bluff, New Zealand, farmer, have invented a certain new and useful Improved Agricultural Implement, of which the following is a specification.

My invention is for an agricultural implement for pulverizing land in place of treating it by a harrow or disk harrow the object of my invention being to pulverize the ground more thoroughly than can be done with harrows.

According to my invention there is a suitable frame on four wheels having mounted about midway of it a vertical spindle, the lower end of which supports two three or more rings provided with teeth or colters on their undersurfaces for the purposes of cutting or pulverizing the ground. The vertical spindle is revolved by suitable sprocket chain and bevel gearing from the rear axle and other gearing is arranged to revolve the rings supported by the spindle each alternate ring revolving in the opposite direction to the ring next it. By means of a lever and sliding arms and pivoted bars the rings are raised clear of the ground when desired, and the depth to which the colters or teeth enter the ground may be regulated. The teeth or colters of the revolving rings are made adjustable and removable so that they can be renewed when necessary. A seat for the driver and a foot rest are provided at suitable positions on the machine, which may be drawn by horse or other power. A set of colters may be placed in front or behind the pulverizing rings.

Figure 1:
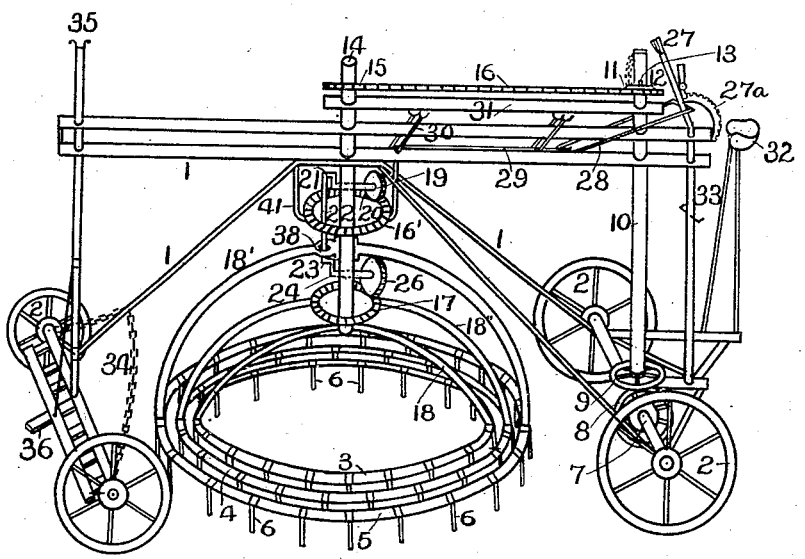
Figure 7:
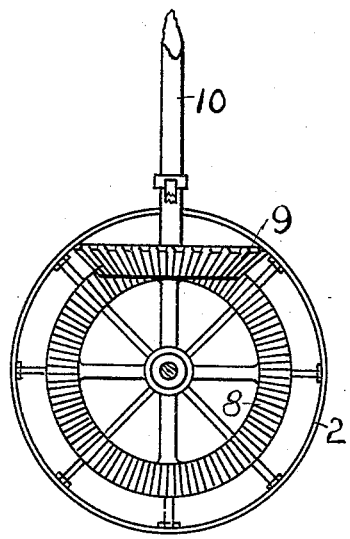
Figure 6:
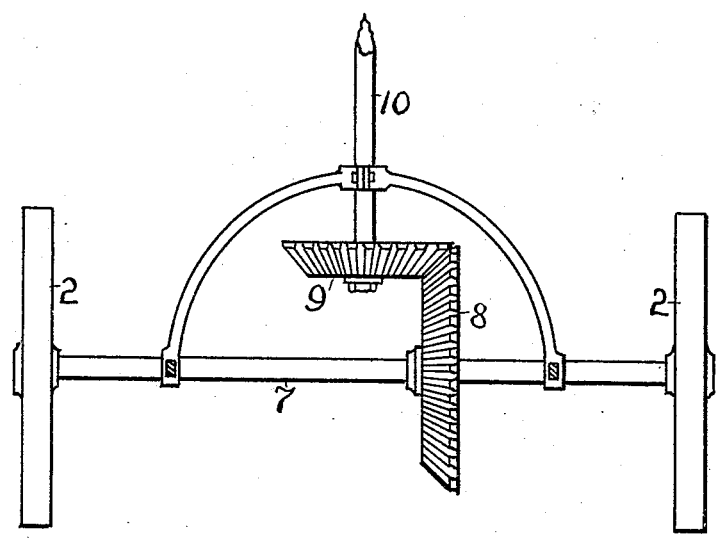

In the accompanying drawings illustrating my invention, Figure 1 is a perspective view of the whole implement. Fig. 2 is an enlarged side view of part of the lifting mechanism. Fig. 3 is a plan view of part of the lifting mechanism shown in Fig. 2.
Fig. 4 is an enlarged detail view of the lever and racked quadrant of the lifting mechanism. Fig. 5 is an enlarged detail view of one arm of the lifting mechanism. Fig. 6 is an enlarged end view of the driving gear on the rear axle. Fig. 7 is a sectional view of the parts shown in Fig. 6. Fig. 8 is an enlarged front view of part of the driving mechanism of the rings.

The implement consists of a frame (1) supported on wheels (2) and carrying a pulverizer formed of a series of hoops or rings (3) (4) (5) each provided with teeth (6) to tear, break or pulverize the ground. The hoops or rings (3) (4) (5) preferably three in number are disposed concentrically to the vertical spindle (14) which revolves in the frame (1), each alternate hoop or ring being adapted to rotate in opposite directions, as hereinafter described. The axle (7) of the rear wheels (2) (2) revolves as the implement is drawn forward and has fixed on it a vertical beveled gear wheel (8) meshing with a horizontal bevel gear wheel (9) secured to the lower end of a vertical spindle (10) which is free to move vertically. Secured near the upper end of the spindle (10) there is a sprocket wheel (11) with a square opening which slides up and down on a squared portion (12) of the spindle (10) in such a manner that the sprocket wheel (11) may be raised or lowered on the spindle (10) without affecting the position of the spindle while at work. By the insertion of a pin (13) through a hole in the hub of the sprocket wheel (11) and a hole in the spindle (10) the spindle (10) may be lifted with the sprocket wheel (11) so as to lift the gear wheel (9) out of gear with the gear wheel (8) when necessary, as hereinafter described. Another spindle (14) revolubly mounted on the frame (1) and free to move vertically also has a sprocket wheel (15), secured to its upper end, which may differ in size from the sprocket wheel (11) according to the speed of revolution desired of the rings (3) (4) and (5). The two sprocket wheels (11) and (15) are connected by a sprocket chain (16) so that the rotation of the spindle (10) rotates the spindle (14) with the alternate pulverizer rings (3) and (5) attached to it by the ribs (18) and (18') respectively. In order to cause the pulverizer ring (4) to rotate in the opposite direction, it is supported by a rib (18'') secured to a beveled toothed ring (17) which is loosely mounted on the spindle (14). Supported by hangers (41) secured to part of the frame (1) is another beveled toothed ring (16') with which meshes a beveled gear wheel (19) secured to one end of a spindle (20) which passes through bearings in the spindle (14) and has at its other end a crank (21) with a vertical connecting rod (22). This connecting rod (22) passes through an opening (38) in the rib (18') and is attached to a similar crank (23) on one end of a spindle (24) to the other end of which the beveled gear wheel (26) is secured so as to mesh with the beveled toothed ring (17). It will be seen that when the spindle (14) is revolved as before described the spindle (20) which passes through it turns round with it and also revolves independently as it turns, by reason of the gear wheel (19) engaging the fixed toothed ring (16'). The spindle (20) operates the crank (21) and connecting rod (22) which in turn operates the crank (23) and spindle (24) with gear wheel (26) which revolves the toothed ring (17) and consequently the pulverizer ring (4) attached to it. The ring (16') is open inside so that the rod (22) has free passage all round as the spindle (14) revolves. The alternate pulverizing rings (3) and (5) revolving in one direction, and the pulverizing ring (4) in an opposite direction, the teeth or blades (6) thereon respectively tear or cut against the ground in opposite directions. To enable the pulverizing rings (3) (4) and (5) to be raised out of operation when the machine is passing over a ridge or for transportation purposes, a lever (27) is provided with racked quadrant and spring pawl (27ª) and rods (28) connected to a sliding bar (29) having pivoted arms (30) similar to a parallel ruler so that when the rods and sliding bar are drawn back by the lever (27) the pivoted arms (30) raise the upper framework (31) in which the spindle (14) is revolubly mounted and supported by a collar. This action also raises the sprocket wheel (11) sliding up the spindle (10) and the sprocket wheel (15) rising with the spindle (14) which also raises the pulverizer rings (3) (4) and (5). When this is done the spindles (10) (14) still revolve and the mechanism keeps on working, but when it is desired to stop the mechanism the pin (13) is inserted as before described thus causing the spindle (10) to be raised with the sprocket wheel (11) thereby lifting the gear wheel (9) out of gear with the gear wheel (8).

A seat (32) and foot rest (33) are provided for the driver. The loose chains (34) connecting the axle of the fore carriage and frame work prevent the front wheels (2) coming against the pulverizing rings (5) when the machine is moving in a curve. Eyes (35) on the frame prevent the reins becoming entangled with the moving parts of the implement. The traction power is obtained from horses or machinery at the point of the pole or shaft (36).

Having now described my invention what I claim as new and desire to secure by Letters Patent is:—

1. In an agricultural implement of the character described, the combination with a plurality of concentrically arranged independent rings, of teeth carried by each thereof, and means for revolving adjacent rings in opposite directions, substantially as described.

2. In an agricultural implement of the character described, the combination with a plurality of concentric toothed rings, of means for revolving adjacent rings in opposite directions, substantially as described.

3. In an agricultural implement of the character described, the combination with a revoluble spindle, of toothed rings carried thereby and designed to revolve therewith, additional toothed rings arranged concentrically to the toothed rings carried by the spindle, and means for revolving the additional rings in a direction opposite to that of the rings revolving with the spindle, substantially as described.

4. In an agricultural implement of the character described, the combination with a traveling frame, of a plurality of concentric toothed rings supported thereby, and means for revolving adjacent rings in opposite directions, substantially as described.

5. In an agricultural implement of the character described, the combination with a traveling frame, of a revoluble spindle mounted therein, toothed rings carried by and designed to revolve with said spindle, additional toothed rings arranged concentrically to those carried by the spindle, and means for revolving the additional rings in a direction opposite to that of the rings carried by the spindle, substantially as described.

6. In an agricultural implement of the character described, the combination with a plurality of concentrically arranged toothed rings, of means for revolving adjacent rings in opposite directions, and means for adjusting the rings vertically, substantially as described.

7. In an agricultural implement of the character described, the combination with a traveling frame including a front and rear axle, of a gear wheel carried by said rear axle, a spindle arranged in proximity to said rear axle, a gear wheel upon said spindle adapted to mesh with the gear wheel on the rear axle, a second, revoluble, spindle, a plurality of concentric toothed rings carried by said revoluble spindle, means for transmitting power from the first to the second named spindle, means for revolving adjacent rings in opposite directions, and means for throwing the gear wheels out of mesh to render the concentric rings inoperative, substantially as described.

8. In an agricultural implement of the character described, the combination with a spindle, of a plurality of toothed rings carried thereby, adjacent rings being designed to revolve in opposite directions, driving means for the spindle and rings, and means for adjusting the spindle and rings vertically and for lifting them out of gear with the driving means, substantially as described.

9. A pulverizer comprising a series of concentric rings provided with teeth, a vertical spindle on which said rings are mounted, a frame in which said spindle rotates, a pair of wheels with connecting axle at each end of and supporting said frame and means between said wheels and said spindle for rotating said spindle and alternate rings and means operated by said spindle for rotating other alternate rings in an opposite direction to the first mentioned rings substantially as described.

In testimony whereof I have signed my name to this specification in the presence of two subscribing witnesses.

ARCHIBALD CLARK ANDERSON.

Witnesses:
CHARLES HENRY ROBERTS,
JOSEPH STOCK.